May 8, 1923.
C. L. JOHNSON
GEAR SHIFT LEVER AND DUST CAP
Filed June 12, 1922
1,454,600
2 Sheets-Sheet 1
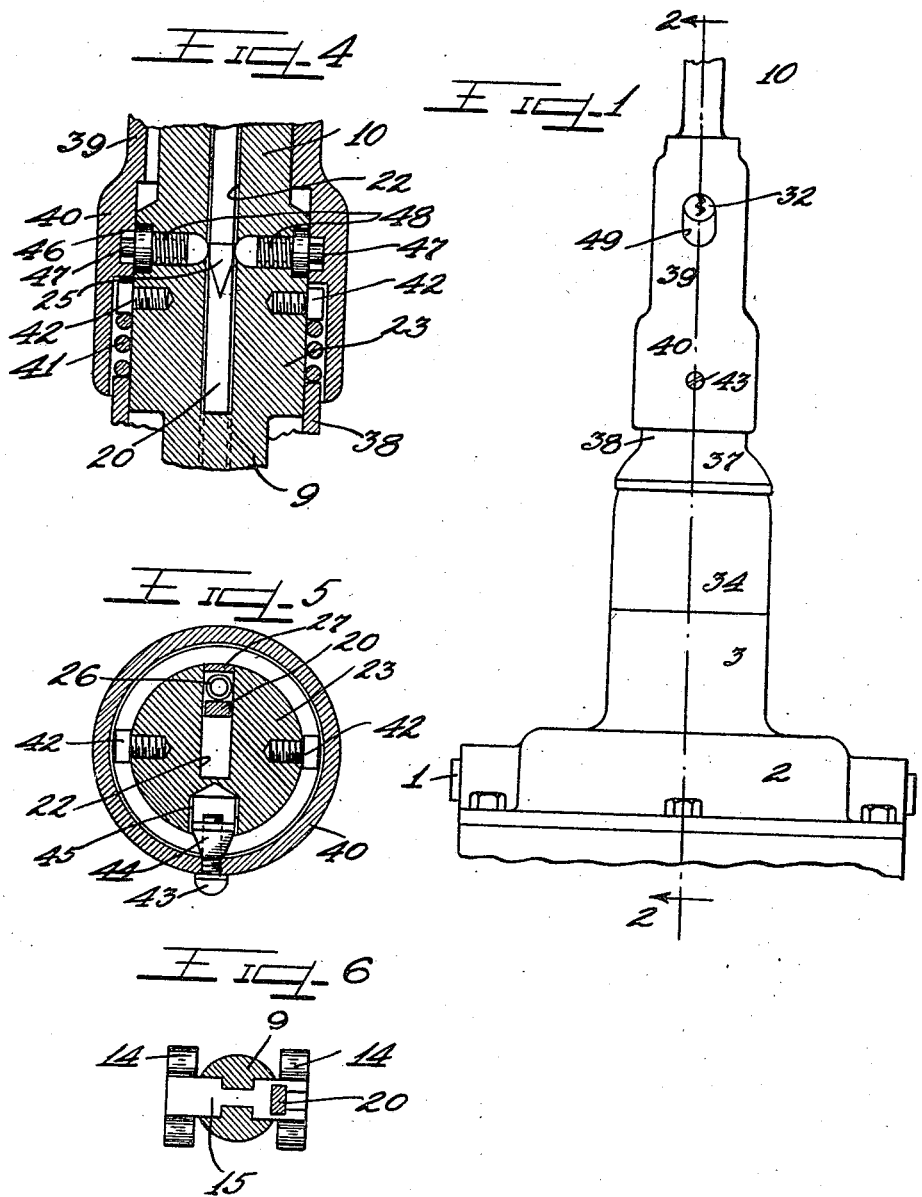

May 8, 1923.
C. L. JOHNSON
1,454,600
GEAR SHIFT LEVER AND DUST CAP
Filed June 12, 1922
2 Sheets-Sheet 2
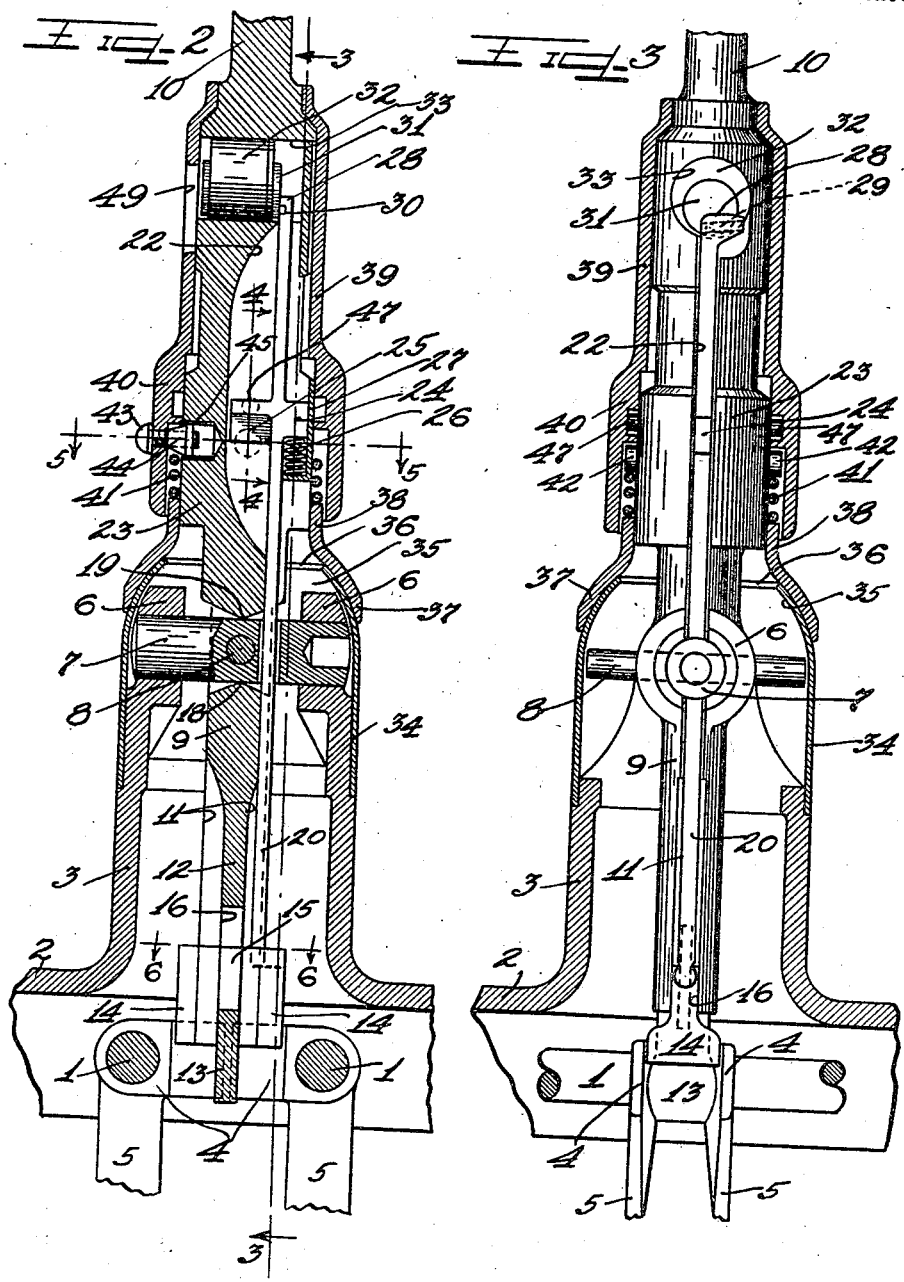
Witnesses
Inventor
COLVIN L. JOHNSON
by ____ Atty.

Patented May 8, 1923.

1,454,600

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

GEAR-SHIFT LEVER AND DUST CAP.

Application filed June 12, 1922. Serial No. 567,841.

*To all whom it may concern:*

Be it known that I, COLVIN L. JOHNSON, a citizen of the United States, and a resident of the city of St. Louis, in the county of St. Louis and State of Missouri, have invented new and useful Improvements in a Gear-Shift Lever and Dust Cap; and I do hereby declare that the following is a full, clear, and exact description of the same, reference being had to the accompanying drawings, and to the numerals of reference marked thereon, which form a part of this specification.

This invention relates to an improved type of a transmission lock wherein the gear shift lever carrying a locking means is provided with a casing or sleeve for protecting the locking parts positioned above the pivot point thereof, said sleeve having a spring therein for the purpose of resiliently holding a bell cap seated upon a hood enclosing the pivot mechanisms of the gear shift lever.

It is an object of this invention to provide a gear shift lever with a spring impelled dust cap intermediate the lever support and a housing on said lever.

It is an important object of this invention to provide an improved method of holding a cap upon the support of a gear shift lever by resilient means protected by a housing locked upon the lever above the pivot point of the lever.

Other and further important objects of this invention will be apparent from the disclosures in the drawings and specification.

The invention (in a preferred form) is illustrated in the drawings and hereinafter more fully described.

On the drawings:

Figure 1 is an elevation of a transmission control device embodying the principles of this invention.

Figure 2 is an enlarged vertical section thereof taken on line 2—2 of Figure 1 with parts in elevation.

Figure 3 is a sectional view taken on line 3—3 of Figure 2.

Figure 4 is a fragmentary detail section taken on line 4—4 of Figure 2.

Figure 5 is an enlarged transverse section taken on line 5—5 of Figure 2.

Figure 6 is a detail section taken on line 6—6 of Figure 2.

As shown on the drawings:

The reference numeral 1 indicates a pair of shiftable parallel transmission rods spaced apart and supported in an automobile transmission housing 2 provided with a housing or pedestal 3. The rods 1 have engaged thereon notched blocks 4 on which gear shift arms 5 are formed. The upper end of the pedestal has a pair of apertured head members 6 integrally formed thereon in which the ends of a cylindrical shaft 7 are rotatably supported.

Pivotally mounted upon the shaft 7 by means of a transverse pin 8, is the tail piece 9 of a gear shift lever 10. The lever tail piece 9 projects downwardly into the pedestal 3 and has oppositely disposed grooves 11 cut longitudinally therein forming a vane 12 having a flattened shift head 13 integral with the lower end thereof and projecting between the notched blocks 4 on the transmission rods 1. Slidably engaged in the tail piece 11 are locking bolts or members 14 connected to one another by a cross piece or bar 15 which projects through and is slidable in a slot 16 provided in the tail piece vane 12. The tail piece 9 is provided with a transverse opening 17 through which the shaft 7 projects. The lever tail piece opening 17 has formed therein a lower rocker edge 18 and an upper rocker edge 19 to permit the lever to be rocked on said shaft about the pivot pin 8.

Connected to the cross bar 15 of the locking bolts is the lower end of a latch bar 20. The latch bar 20 extends upwardly in one of the tail piece grooves 11 through an opening 21 in the shaft 7 and then projects into a deeper groove or recess 22 provided in an enlarged portion 23 of the lever 10 above the pivotal support thereof. Integrally formed on opposite sides of the latch bar 20 within the recess 22 is a stop lug 24 and a tapered cam or wedge 25 as illustrated in Figure 2. A coiled spring 26 is seated on an angle bracket 27 secured in the lever recess 22. The upper end of the spring 26 presses against the latch bar lug 24. The upper end of the latch bar 20 has integrally formed thereon a head 28 provided with an inclined slot 29. A pin 30 on the barrel 31 of a pin lock 32 projects into the slot 29 of the latch bar head 28. The pin lock 32 is mounted in a chamber 33 formed in the lever and is adapted to be actuated by means of a key to cause rotation of the lock barrel whereby the latch bar may be lowered to move the locking bolts 14 into locking engagement in the notches of the blocks 4 of the transmission rods.

The pedestal 3 is provided with a peripheral recess or groove for receiving the lower end of a hood 34 seated therein. The hood 34 encloses the lever pivot mechanisms and has the upper end thereof rounded to form a dome 35. The upper end of the hood 34 is provided with an opening 36 through which the gear shift lever projects.

Adjustably seated upon the rounded dome 35 of the hood 34 is a bell shaped cap 37 the upper reduced end of which is formed to afford a collar 38 which projects upwardly and engages around the enlarged portion 23 of the gear shift lever. The latch bar mechanisms in the enlarged portion 23 of the lever are enclosed by means of a tubular casing or protecting sleeve 39, the lower end 40 of which is enlarged and engages around the collar 38 of the cap 37. Disposed within the enlarged lower end 40 of the sleeve 39 and around the enlarged portion 23 of the gear is a coiled spring 41 the lower end of which seats against the upper end of the cap collar 38. The upper end of the coiled spring 41 bears against the heads of a pair of oppositely disposed stop screws 42 secured in the enlarged portion 23 of the gear shift lever. For the purpose of holding the sleeve 39—40 locked in a set position on the enlarged portion 23 of the gear shift lever a retaining screw 43 threaded through an aperture in said sleeve engages in a nut member 44 positioned within a recess 45 of the enlarged portion 23 of the gear shift lever.

The enlarged porton 40 of the sleeve 39 is provided with an interior groove 46 to receive the ends of two oppositely disposed locking pins 47 mounted within a diametric passage in the enlarged portion 23 of the gear shift lever. Springs 48 are engaged on the locking pins 47 for normally holding the pins retracted with the rounded heads thereof contacting one another in the path of the tapered lever wedge 25 when the latch bar 20 is in its elevated or release position to permit operation of the gear shift lever. The sleeve 39 is provided with an opening 49 to afford access to the key slot of the pin lock 32.

The operation is as follows:

When the gear shift lever 10 is in neutral position the shift head 13 on the lower end thereof is positioned between the transmission rods 1 and the notches in the blocks 4. When the lever is to be operated the locking bolts or members 14 are in elevated release position. To shift the gears of a transmission a composite movement of the gear shift lever is necessary, that is, the lever must be thrown to one side and either forwardly or rearwardly for the purpose. The shift head 13 is thus moved into the notch of one of the blocks 4. The forward and rearward movement of the lever will thus cause the engaged transmission rod to be shifted to effect a shifting of the gears of the transmission.

In the unlocked position of the gear shift lever, the pin 30 of the pin lock 32 is in its uppermost position, thereby holding the latch bar 20 elevated with the locking bolts 14 raised out of engagement with the transmission rod blocks 4. With the latch bar raised, the wedge 25 is also elevated to permit the springs 48 to hold the locking pins 47 retracted and free of the guard sleeve 39—40. It will thus be seen that when the lever is unlocked the guard sleeve 39—40 may be easily released by removing the retaining screw 43. The guard sleeve 39—40 may now be shifted longitudinally on the gear shift lever to afford access to the operating parts of the lock. The spring 26 acting on the latch bar lug 24 serves to assist in raising the latch bar into release position when the pin lock 32 is unlocked by means of a key. With the retaining screw 43 removed, the spring impelled cap 37 and the hood 34 may be lifted so that access may be had to the pivot members 7 and 8 of the gear shift lever.

To lock the gear shift lever 10 from movement, it is first moved into neutral position and by means of a key projected through the sleeve opening 49 and inserted into the pin lock 32, the lock barrel 31 is rotated. The pin 30 acting in the slot 29 of the latch bar head 28 forces the latch bar 20 downwardly against the action of the spring 26 which is compressed. With the downward movement of the latch bar the wedge 25 thereon is forced downwardly between the rounded heads of the locking pins 47 as illustrated in Figure 4, thereby forcing said pins outwardly into the sleeve groove 46 against the action of the control springs 48 which are compressed. It will thus be noted that when the latch bar is lowered into locking position, that the locking pins 47 serve to lock the guard sleeve 39—40 from the inside against longitudinal movement on the gear shift lever even when the retaining screw 43 is removed. With the guard sleeve 39—40 locked in position from the interior the spring 41 contacting the set screws 42 acts to resiliently hold the cap 37 seated upon the dome 35 of the hood 34. Access to the operating parts of the transmission lock cannot be had by shifting the guard sleeve 39—40 when the latch bar is in lowered locking position in view of the fact that the guard sleeve is locked against movement from the interior by the locking pins 47 which engage in the groove 46 of the guard sleeve. In either locked or unlocked positions of the latch bar 20 the spring 41 acts to resiliently hold the cap 37 against the top dome portion of the hood to provide a dust tight friction joint with the cap 37 and the hood 34 protecting the supporting members of the gear shift lever as well as the latching mechanisms disposed within the pedestal 3 on the tail piece of the lever.

When the latch bar 20 is lowered, the locking bolts 14 are simultaneously pushed downwardly to engage in the notches of the blocks 4 on the rods 1 as illustrated in Figures 1 and 2, thereby locking the gear shift lever in neutral position and preventing the same from being thrown sideways to engage the shift head 13 in either one of the notched blocks 4. The transmission is thus locked against operation.

I am aware that numerous details of construction may be varied through a wide range without departing from the principles of this invention, and I therefore do not purpose limiting the patent granted otherwise than necessitated by the prior art.

I claim as my invention:

1. The combination with a support, of a gear shift lever supported thereon, a hood on said support, a sleeve locked on said lever, a cap resting on said hood and projecting into said sleeve, and means in said sleeve for resiliently holding said cap against said hood.

2. The combination with a gear shift lever and the support therefor, of a spring impelled cap between said lever and said support.

3. The combination with a gear shift lever and the support therefor, of a guard sleeve on said lever, and a spring impelled cap between said support and said sleeve for enclosing parts of the lever disposed between said support and said sleeve.

4. The combination with a gear shift lever and the support therefor, of a hood on said support, and a spring impelled cap engaged on said hood.

5. The combination with a gear shift lever and the support therefor, of a hood engaged on said support, a cap engaged around said lever, and a spring on said lever for resiliently holding said cap in contact with said hood.

6. The combination with a gear shift lever and the support therefor, of a hood engaged on said support, a cap engaged around said lever, stops on said lever, and a resilient member on said lever bearing against said stops for resiliently holding said cap seated on said hood.

7. The combination with a gear shift lever, of a sleeve secured thereon, a cap on said lever telescoping into said sleeve, and a spring in said sleeve for holding said cup projected.

8. The combination with a support, of a gear shift lever supported therein, a hood engaged on said support, a sleeve on said lever above the hood, means for locking said sleeve in place, stops on said lever enclosed by said sleeve, a cap engaged around said lever and projecting into said sleeve, and a spring on said lever between said stops and said cap for resiliently holding the cap seated on said hood.

In testimony whereof I have hereunto subscribed my name in the presence of two subscribing witnesses.

COLVIN L. JOHNSON.

Witnesses:
CARLTON HILL,
OSCAR HARTMANN.